United States Patent
Jamola

(10) Patent No.: US 9,563,161 B1
(45) Date of Patent: Feb. 7, 2017

(54) IMAGE FORMING APPARATUS

(71) Applicant: KYOCERA Document Solutions Inc., Osaka (JP)

(72) Inventor: Ronna Faye Q. Jamola, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/157,788

(22) Filed: May 18, 2016

(30) Foreign Application Priority Data

Aug. 21, 2015  (JP) ................................ 2015-163649

(51) Int. Cl.
| | | |
|---|---|---|
| *G03G 15/00* | (2006.01) | |
| *G03G 15/01* | (2006.01) | |
| *H04N 1/00* | (2006.01) | |
| *H04N 1/60* | (2006.01) | |
| *G06F 3/12* | (2006.01) | |

(52) U.S. Cl.
CPC .......... *G03G 15/50* (2013.01); *G03G 15/0121* (2013.01); *G06F 3/1219* (2013.01); *G06F 3/1229* (2013.01); *G06F 3/1239* (2013.01); *H04N 1/00023* (2013.01); *H04N 1/6008* (2013.01); *H04N 2201/0094* (2013.01)

(58) Field of Classification Search
CPC ... G03G 15/50; G03G 15/0121; G06F 3/1219; G06F 3/1229; G06F 3/1239; H04N 1/00023; H04N 1/6008
See application file for complete search history.

(56) References Cited

U.S. PATENT DOCUMENTS

| 8,446,602 | B2 | 5/2013 | Harris et al. |
| 2005/0063749 | A1 | 3/2005 | Harris et al. |
| 2008/0175641 | A1 | 7/2008 | Harris et al. |
| 2008/0260396 | A1* | 10/2008 | Yamada ................. G03G 15/50 399/27 |
| 2010/0037286 | A1* | 2/2010 | Cain ....................... G06F 3/121 726/1 |
| 2011/0242560 | A1* | 10/2011 | Yamada ............... G03G 15/556 358/1.9 |

FOREIGN PATENT DOCUMENTS

JP          2005-512199 A        4/2005

* cited by examiner

*Primary Examiner* — Sandra Brase
(74) *Attorney, Agent, or Firm* — Studebaker & Brackett PC

(57) ABSTRACT

An image forming apparatus includes image forming parts, developer containers, developer amount detecting parts, a use setting part and a limit setting part. The image forming parts execute an image forming operation for respective colors of developers. The developer container contains the developer to be supplied to the image forming part. The developer amount detecting part detects a developer amount contained in the developer container. The use setting part sets a use condition indicating whether each developer is usable or unusable. The limit setting part sets a limit condition indicating a limit value of the developer amount to be maintained in each developer container. The image forming part executes the image forming operation in accordance to the use condition set by the use setting part, to the developer amount detected by the developer amount detecting part, and to the limit condition set by the limit setting part.

10 Claims, 10 Drawing Sheets

FIG. 3

SECTION MANAGEMENT SCREEN

| SELECT | SECTION CODE | SECTION NAME | |
|---|---|---|---|
| ☑ | 1 | SAMPLE 1 | SET |
| ☐ | 2 | SAMPLE 2 | SET |
| | | | |

Buttons: ALL SELECT | NON SELECT | ADD SECTION | REMOVE SECTION

FIG. 4

USER MANAGEMENT SCREEN

| SELECT | USER ID | USER NAME | |
|---|---|---|---|
| ☑ | 1 | USER 1 | SET |
| ☐ | 2 | USER 2 | SET |
| | | | |

Buttons: ALL SELECT | NON SELECT | ADD USER | REMOVE USER

| SECTION ADDING SCREEN | |
|---|---|
| SECTION INFORMATION | |
| SECTION NAME : | |
| SECTION CODE : | |

USE LIMIT

| COPY USE LIMIT (TOTAL) : | SET |
|---|---|
| COPY USE LIMIT (FULL COLOR) : | SET |
| PRINTER USE LIMIT (TOTAL) : | SET |
| PRINTER USE LIMIT (FULL COLOR) : | SET |
| SCANNER USE LIMIT (OTHER) : | SET |
| FAX TX LIMIT : | SET |
| TONER USE LIMIT : | SET |

| RETURN | ADD | RESET |
|---|---|---|

USER ADDING SCREEN

USER INFORMATION

USER NAME :

USER ID :

PASSWORD :

COMFIRM PASSWORD :

ACCESS LEVEL : ○ MANAGER ● USER

ACCOUNT NAME :

E-MAIL ADDRESS :

LANGUAGE : English ▼

USE LIMIT

COPY USE LIMIT : SET

PRINTER USE LIMIT : SET

TONER USE LIMIT : SET

RETURN   ADD   RESET

FIG. 7

| TONER USE LIMITING SCREEN | | | |
|---|---|---|---|
| SECTION NAME/ USER NAME : | SAMPLE 1 ~70 | | |
| SECTION CODE/ USER ID : | 1 ~71 | | |
| TONER USE LIMIT ~72 | | | |
| TONER LEVEL | | USEABLE/ UNUSEABLE | TONER LIMIT VALUE |
| BLACK | 6% | USEABLE | 0 % |
| CYAN | 6% | UNUSEABLE | Off |
| MAGENTA | 85% | USEABLE | 5 0 % |
| YELLOW | 6% | UNUSEABLE | Off |
| RETURN | | REGIST | RESET |

FIG. 12

| | TONER LEVEL | USEABLE/ UNUSEABLE | TONER LIMIT VALUE |
|---|---|---|---|
| BLACK | 50% | USEABLE | 50% |
| CYAN | 15% | UNUSEABLE | 15% |
| MAGENTA | 75% | USEABLE | 15% |
| YELLOW | 92% | UNUSEABLE | |

PRINTER SETTING → TONER USE LIMIT

IMAGE FORMING APPARATUS

INCORPORATION BY REFERENCE

This application is based on and claims the benefit of priority from Japanese Patent application No. 2015-163649 filed on Aug. 21, 2015, the entire contents of which are incorporated herein by reference.

BACKGROUND

The present disclosure relates to an image forming apparatus.

Conventionally, an image forming apparatus is configured to be able to implement printing and copying processes, for example, while selecting a monochrome image, a grayscale image, a color image or the like. In companies and schools holding a large number of sections and users, a large amount of developers, such as a toner and an ink, is consumed by a common image forming apparatus. Then, it is demanded to be able to cut a developer consumption amount of such image forming apparatus.

For instance, there is proposed an image printing method achieving the cut of the ink consumption amount of the printer by processing data stream and print command stream such that a number of dots printed by the printer is reduced.

As the developers of the image forming apparatus, a plurality of colors, e.g., magenta, cyan, yellow and black, are prepared. Then, there are many cases when the developer of a specific color is more often used and the plurality of colors is not evenly consumed in the image forming apparatus. However, the conventional image forming apparatus is unable to manage the consumption of the developer for each color.

Still further, in a case where a large number of users or sections use the common image forming apparatus, a specific user or section may excessively use the developer of a specific color. Then, the uneven use of the developers of the plurality of color becomes remarkable, possibly causing such a situation in which the other users and sections are unable to user the image forming apparatus.

If the developers of the plurality of colors are unevenly used, it takes a time to replenish the developers and to maintain the developing unit in terms of management of the common image forming apparatus. Still further, because it is difficult to supervise amounts of the developers used by the respective users and sections, it is unable to make even among the users and sections even if developer consumption costs varies.

SUMMARY

In accordance with an embodiment of the present disclosure, an image forming apparatus includes image forming parts, developer containers, developer amount detecting parts, a use setting part and a limit setting part. The image forming parts execute an image forming operation capable of forming images for respective colors of developers. The developer containers contain the developers of the respective colors to be supplied to the image forming parts. The developer amount detecting parts detect developer amounts of the respective colors contained in the developer containers. The use setting part sets a use condition indicating whether the developer is usable or unusable for each color. The limit setting part sets a limit condition indicating a limit value of the developer amount of each color to be maintained in each developer container. Each of the image forming parts executes the image forming operation in accordance to the use condition set by the use setting part, to the developer amount detected by each of the developer amount detecting parts, and to the limit condition set by the limit setting part.

The above and other objects, features, and advantages of the present disclosure will become more apparent from the following description when taken in conjunction with the accompanying drawings in which a preferred embodiment of the present disclosure is shown by way of illustrative example.

BRIEF DESCRIPTION OF THE DRAWINGS

FIG. 3 is a plan view showing an example of a section management screen displayed by an operation display part in the multifunction peripheral according to the embodiment of the present disclosure.

FIG. 4 is a plan view showing an example of a user management screen displayed by the operation display part in the multifunction peripheral according to the embodiment of the present disclosure.

FIG. 5 is a plan view showing an example of a section adding screen displayed by the operation display part in the multifunction peripheral according to the embodiment of the present disclosure.

FIG. 6 is a plan view showing an example of a user adding screen displayed by the operation display part in the multifunction peripheral according to the embodiment of the present disclosure.

FIG. 7 is a plan view showing an example of a toner use limiting screen displayed by the operation display part in the multifunction peripheral according to the embodiment of the present disclosure.

FIG. 12 is a plan view showing an example of a toner use limit confirmation screen displayed by a user terminal device in the multifunction peripheral according to the embodiment of the present disclosure.

DETAILED DESCRIPTION

Figure 1:
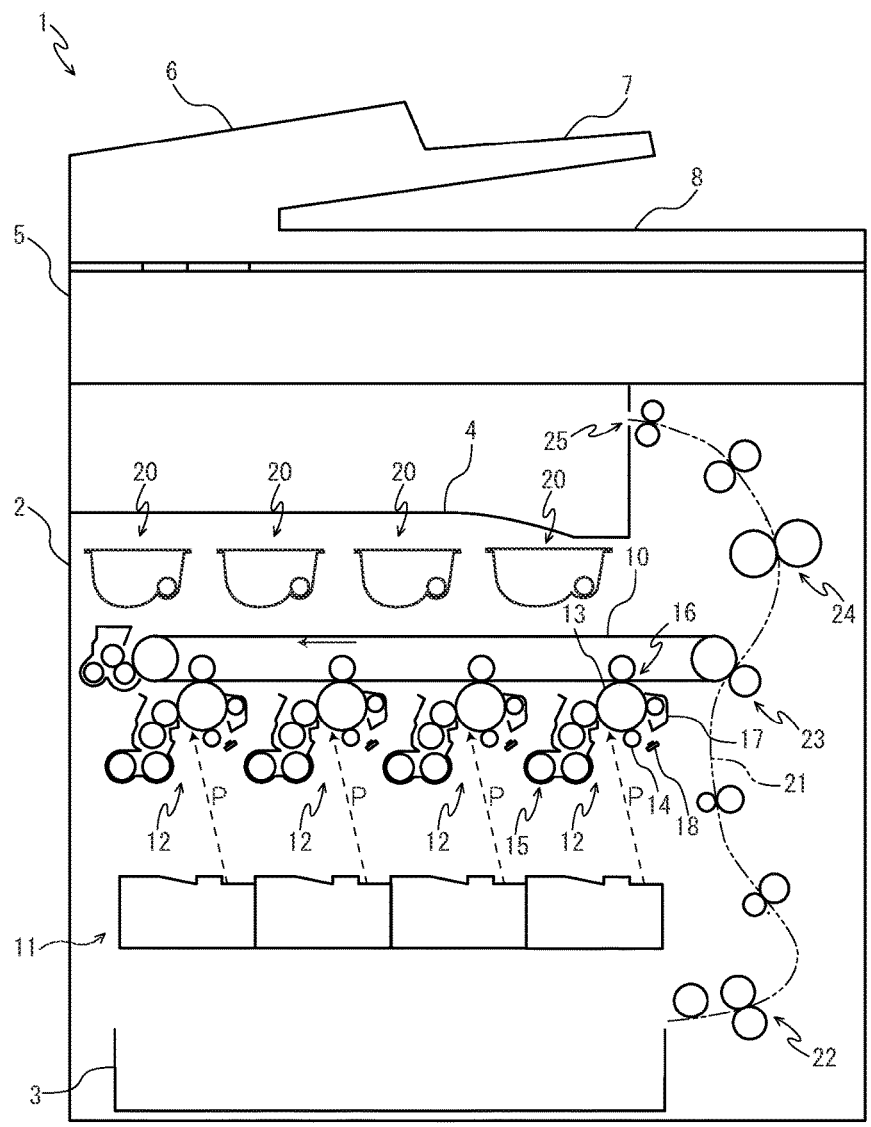
FIG. 1 is a sectional view schematically showing a structure of a multifunction peripheral according to an embodiment of the present disclosure.

Firstly, with reference to FIG. 1, the entire structure of a multifunction peripheral 1 as an image forming apparatus according to an embodiment of the present disclosure will be described. FIG. 1 is a sectional view illustrating the multifunction peripheral 1.

As shown in FIG. 1, the multifunction peripheral 1 includes a box-formed printer main body 2. In a lower part of the printer main body 2, a sheet feeding cartridge 3 storing a sheet (not shown) is arranged. In an upper part of the printer main body 2, a first ejected sheet tray 4 is arranged. The sheet feeding cartridge 3 and the first ejected sheet tray 4 are used for conveying the sheet on which an image is formed by an image forming part 12 in the printer main body 2.

Above the first ejected sheet tray 4 in the upper part of the printer main body 2, an image reading device 5 reading an object shown by a document as image data is arranged. Above the image reading device 5, a document conveying part 6, such as an auto document feeder (ADF), feeding the document to the image reading device 5 is arranged. On an upper face of the document conveying part 6, a fed sheet tray 7 is arranged and, below the fed sheet tray 7, a second ejected sheet tray 8 is arranged. The fed sheet tray 7 and the second ejected sheet tray 8 are used for conveying the document from which the image is read by the image reading device 5. Incidentally, the image reading device 5 may be configured together with the document conveying part 6, the fed sheet tray 7 and the second ejected sheet tray 8 in a body.

In a middle part inside the printer main body 2, an intermediate transferring belt 10 is disposed around a plurality of rollers. Below the intermediate transferring belt 10, an exposure device 11 composed of a laser scanning unit (LSU) is arranged. Near the intermediate transferring belt 10, four image forming parts 12 are installed for respective colors (e.g. four colors of magenta, cyan, yellow and black) of toners (developers) along a lower part of the intermediate transferring belt 10. In each image forming part 12, a photosensitive drum 13 is rotatably arranged. Around the photosensitive drum 13, a charger 14, a development device 15, a first transferring part 16, a cleaning device 17 and a static eliminator 18 are located in order of first transferring processes. Above the development device 15, each of toner containers 20 as four toner cases (developer containers) corresponding to the respective image forming parts 12 are arranged for the respective toner colors (e.g. four colors of magenta, cyan, yellow and black). Each toner container 20 contains the toner of each color.

At one side (at a right side on the figure) inside the printer main body 2, a conveying path 21 for the sheet is arranged. At an upstream end of the conveying path 21, a sheet feeding part 22 is positioned. At an intermediate stream part of the conveying path 21, a second transferring part 23 is positioned at one end (a right end on the figure) of the intermediate transferring belt 10. At a downstream part of the conveying path 21, a fixing part 24 is positioned. At a downstream end of the conveying path 21, a sheet ejection port 25 is positioned.

Figure 2:
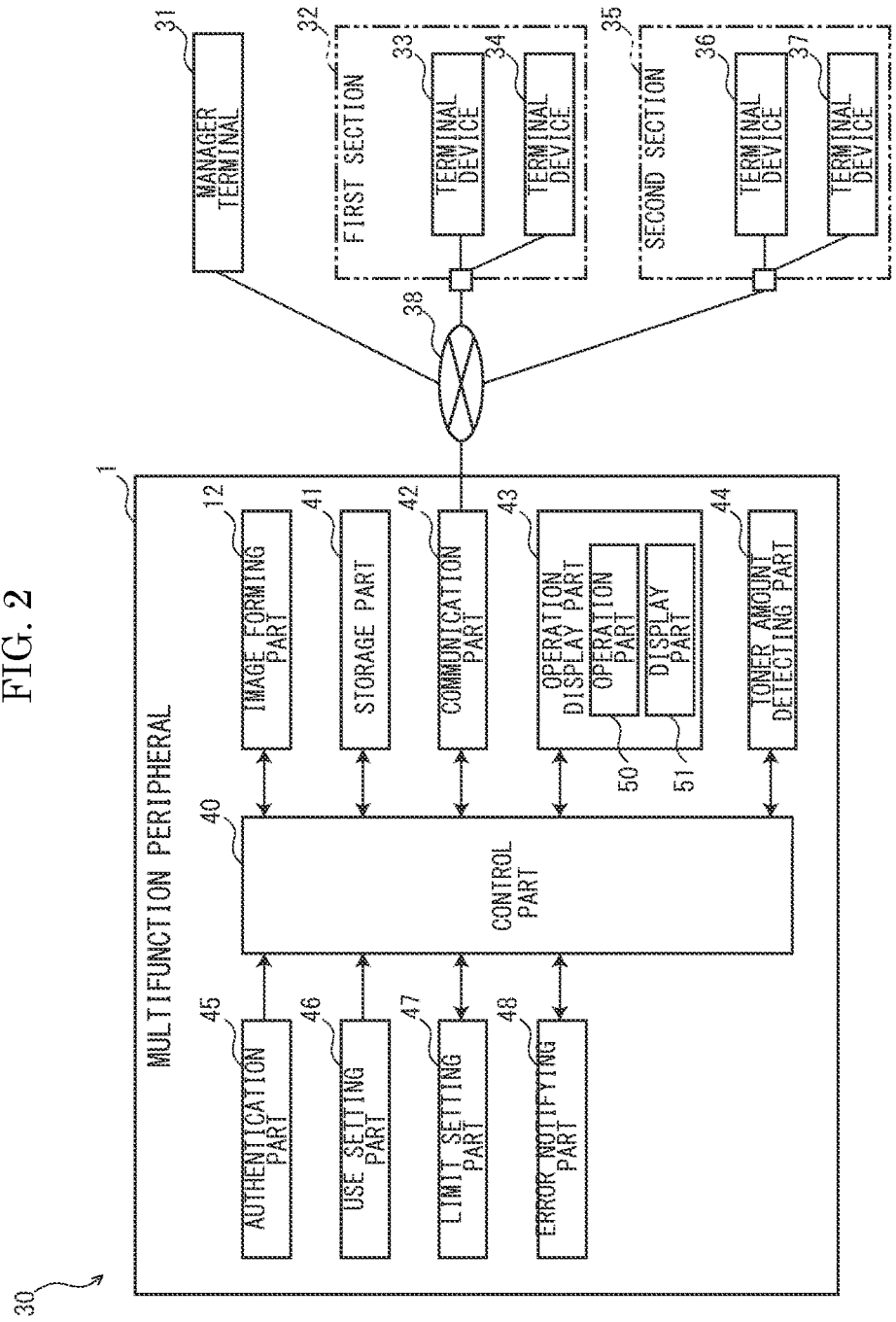
FIG. 2 is a block diagram schematically showing an electrical configuration of an image forming system including the multifunction peripheral according to the embodiment of the present disclosure.

Next, an image forming system 30 including the multifunction peripheral 1 will be explained with reference to FIGS. 1 and 2. FIG. 2 is a block diagram schematically illustrating the image forming system 30 including the multifunction peripheral 1. As shown in FIG. 2, the image forming system 30 includes the multifunction peripheral 1 described above, a manager terminal 31, terminal devices 33 and 34 of a first section 32, and terminal devices 36 and 37 of a second section 35. It is noted that while FIG. 2 illustrates a case in which the image forming system 30 includes one manager terminal 31, the image forming system 30 may include two or more manager terminals 31. While FIG. 2 illustrates a case in which the image forming system 30 includes two sections of the first section 32 and the second section 35, the image forming system 30 may include one or three or more sections. Still further, while FIG. 2 illustrates a case in which the first section 32 includes the terminal devices 33 and 34 and the second section 35 includes the terminal devices 36 and 37, the first section 32 and the second section 35 may include one or three or more terminal devices.

The multifunction peripheral 1 is connected with the manager terminal 31, the terminal devices 33 and 34 of the first section 32, and the terminal devices 36 and 37 of the second section 35 through a network 38. The first section 32 and the second section 35 indicate a group (section) to which one or more users, e.g., employees, belong. For instance, the image forming system 30 may be configured by providing a by-section interface, such as a router and a hub, connected to the network 38 in the first section 32 and the second section 35 and by connecting the terminal devices 33 and 34 of the first section 32 and the terminal devices 36 and 37 of the second section 35 with the respective by-section interfaces.

The multifunction peripheral 1 includes a control part 40 composed of a CPU and others and a storage part 41 composed of a ROM, a RAM, and others within the apparatus body 2. The control part 40 is connected with the image forming part 12 and other respective parts provided in the multifunction peripheral 1 described above and is also connected with a communication part 42, an operation display part 43, toner amount detecting parts 44 (developer amount detecting parts) corresponding to each toner color, an authentication part 45, a use setting part 46, a limit setting part 47, and an error notifying part 48. The image forming part 12 executes the image forming operation based on a signal transmitted from the control part 40.

The storage part 41 stores programs necessary for controlling an image forming process and for integrally controlling the multifunction peripheral 1. The control part 40 executes arithmetic processing in accordance to the respective programs stored in the storage part 41 and controls the respective parts connected with the control part 40. It is noted that the authentication part 45, the use setting part 46, the limit setting part 47, and the error notifying part 48 described above may be composed of programs stored in the storage part 41 and executed by the control part 40.

Still further, in a case when identification information peculiar to each section is registered in order to implement a section management in the multifunction peripheral 1, i.e., in a case when the section management is enabled in the multifunction peripheral 1, the identification information of the section is stored in the storage part 41. Still further, in a case when identification information peculiar to each user is registered in order to implement a user management in the multifunction peripheral 1, i.e., the user management is enabled in the multifunction peripheral 1, identification information of the user is stored in the storage part 41. The identification information peculiar to each section stored in the storage part 41 includes, for example, a section name, a section code, and others. The identification information peculiar to each user stored in the storage part 41 includes, for example, a user name, a user ID, a password, a mail address, a code of a belonging section, a manager flag, and others.

The communication part 42 is communicably connected with the manager terminal 31, the terminal devices 33 and 34 of the first section 32, and the terminal devices 36 and 37 of the second section 35, arranged outside the multifunction peripheral 1, through the network 38 such as WAN (Wide Area Network) and LAN (Local Area Network). It is noted that the network 38 may be wired or wireless.

The operation display part 43 includes an operation part 50 and a display part 51. The operation part 50 is, for example, composed of operation keys, such as a start key, a stop/clear key, a power supply key, and ten keys. The display part 51 is, for example, composed of a touch panel displaying an operation screen. It is noted that the touch panel of the display part 51 may be used also as the operation part 50.

The operation display part 43 also includes a section management button and a user management button (both not shown), which are operable by the manager while logging in the multifunction peripheral 1, in the operation part 50. Then, the display part 51 displays a section management screen 60 (see FIG. 3) and a user management screen 61 (see FIG. 4) corresponding to an operation made on the section management button or the user management button.

As shown in FIGS. 3 and 4, the section management screen 60 and the user management screen 61 include a section adding button 62 and a user adding button 63 for newly registering a section and a user (account) to the multifunction peripheral 1, respectively. Corresponding to an operation of the section adding button 62 or the user adding button 63, the operation display part 43 displays a section adding screen 64 (see FIG. 5) or a user adding screen 65 (see FIG. 6) on the display part 51.

As illustrated in FIGS. 5 and 6, the section adding screen 64 and the user adding screen 65 are screens enabling to set the identification information as described above about the newly registered section and user. Still further, the section adding screen 64 and the user adding screen 65 are configured to be able to set a limit on use of toner in addition to a limit on use for printing and copying to limit on use of the multifunction peripheral 1 for the newly registered section and user. The account adding screen (the section adding screen 64) includes, for example, a toner use limiting button 66 and the operation display part 43 displays a toner use limiting screen 67 (see FIG. 7) on the display part 51 corresponding to an operation of the toner use limiting button 66. The toner use limiting screen 67 will be described later in detail.

The section management screen 60 and the user management screen 61 selectably display lists of the sections (section names) and the users (user names) already registered in the multifunction peripheral 1. If either section or user is selected in the section management screen 60 and the user management screen 61, the operation display part 43 displays a section information change screen (not shown) and a user information change screen (not shown) about the selected section or user.

It is noted that the section information change screen and the user information change screen described above are screens in which the identification information of the already registered section and user can be changed and which can be operable during when the manager is logged in. The identification information that can be changed in the section information change screen and in the user information change screen is the same with the identification information that can be set in the section adding screen 64 and the user adding screen 65. For instance, the section information change screen and the user information change screen may be configured in the same manner with the section adding screen 64 and the user adding screen 65 except that the section information change screen and the user information change screen are configured to include the registration button instead of the adding buttons in the section adding screen 64 and the user adding screen 65.

The toner amount detecting parts 44 are provided at the respective toner containers 20 for respective toner colors. Each toner amount detecting part 44 detects a toner amount (developer amount) contained within each toner container 20 and notifies the toner amount, i.e., a detection result, to the control part 40.

The authentication part 45 authenticates the user or the section based on the identification information peculiar to the user or the section and determines whether or not the user or the section is allowed to log in.

For instance, if the multifunction peripheral 1 is in a state in which no user is logged in (log-out state) in the case in which the section management is enabled, the authentication part 45 displays a section log-in screen (not shown) on the operation display part 43. When the user inputs identification information of the section in the section log-in screen, the authentication part 45 collates the identification information inputted by the user with identification information stored in the storage part 41, and when the authentication is successful, the multifunction peripheral 1 is put into a log-in state of this section.

Still further, for example, if the multifunction peripheral 1 is in a state in which no user is logged in (log-out state) in the case in which the user management is enabled, the authentication part 45 displays a user log-in screen (not shown) on the operation display part 43. When the user inputs identification information of the user into the user log-in screen, the authentication part 45 collates the identification information inputted by the user with identification information stored in the storage part 41, and when the authentication is successful, the multifunction peripheral 1 is put into a log-in state of this user. Still further, if a section code is included in the identification information of the user stored in the storage part 41 when the user authentication is successful (when the user logs in), the multifunction peripheral 1 is put into a log-in state of this section. It is noted that if a manager flag of the identification information of the logged-in user is ON, the authentication part 45 authenticates the user as a manager.

The use setting part 46 sets use conditions indicating whether toner is usable or unusable for each color of the toner. The use setting part 46 sets the use conditions for each section or each user corresponding to the operation of the toner use limiting screen 67 described above.

The limit setting part 47 sets a limit condition indicating a toner remaining amount (referred to also as a toner limit value or a limit value of developer amount, hereinafter) to be maintained within the toner container 20. The limit setting part 47 sets the limit conditions for each section and each user corresponding to the operation of the toner use limit screen described above.

As shown in FIG. 7, the toner use limiting screen described above displays an account name column 70 indicating a section name or a user name of the section or the user to be set and an account ID column 71 indicating a section code or a user ID of the section or the user to be set. Still further, the toner use limit screen 67 indicates a present toner amount (referred to also as a toner level, hereinafter) for each toner color and displays switching buttons 73 enabling to change use conditions of usable/unusable of the tones of the respective colors and an input box 74 enabling to change limit conditions of the toner limit values.

In the toner use limiting screen 67, a toner color name 75 and a level bar 76 indicating a toner amount with respect to a toner maximum storage amount within the toner container

20 in terms of ratio (percentage) is indicated in the toner level 72 of each color. The toner amount is calculated based on a detection result of the toner amount detecting part 44. It is noted that the level bar 76 of each toner may be colored by the color of the toner, and when the toner is unusable, the color of the toner colored in the bar is thinned and a message of unusable is indicated.

The toner use limiting screen 67 is configured such that the use conditions of usable/unusable of the toners of the respective colors are changed over every time when the switching button 73 is pressed. The use setting part 46 sets the use conditions of the toners of the respective colors regarding each section or each user based on an input of the use conditions of usable/unusable of the toners of the respective colors in the toner use limiting screen 67 of each section or each user.

The toner use limiting screen 67 is also configured such that the limit condition of the toner limit value of each toner color can be inputted to the input box 74 as the ratio (percentage) of the toner amount with respect to the toner maximum storage amount within the toner container 20, and if a toner is unusable, it is unable to input into the input box 74, which indicates Off. The limit setting part 47 sets the limit conditions of the respective toner colors for each section and each user based on the input of the limit conditions of the toner limit values of the respective toner colors in the toner use limiting screen 67 of each section or each user, and stores the limit conditions in the storage part 41.

Figure 8:
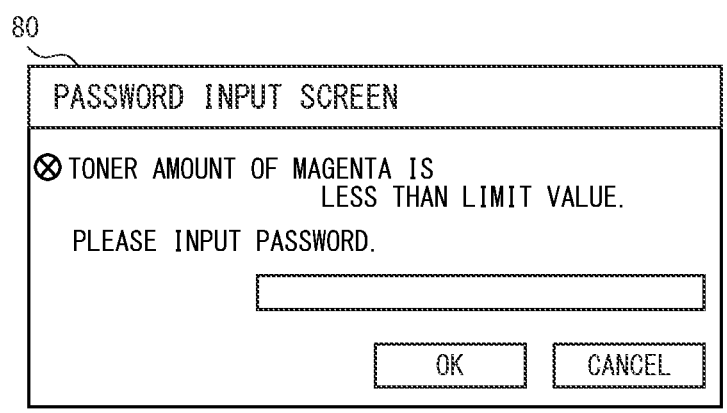
FIG. 8 is a plan view showing an example of a password input screen displayed by the operation display part in the multifunction peripheral according to the embodiment of the present disclosure.
Figure 9:
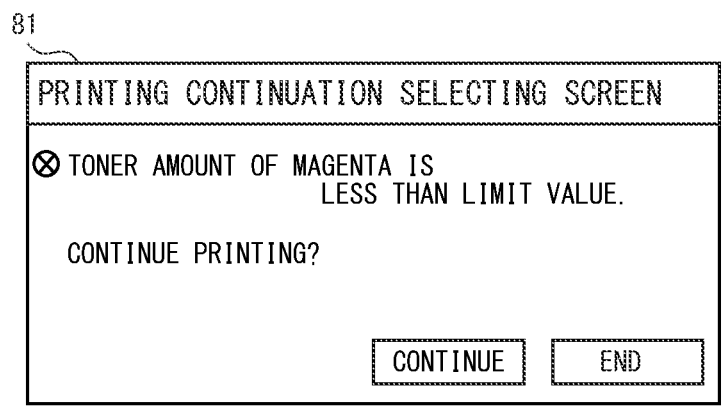
FIG. 9 is a plan view showing an example of a printing continuation selecting screen displayed by the operation display part in the multifunction peripheral according to the embodiment of the present disclosure.

The error notifying part 48 displays an error screen in the display part 51 of the operation display part 43 to notify an error in a case when a toner amount of a predetermined color detected by the toner amount detecting part 44 is less than a toner limit value set as the limit condition in the limit setting part 47. The error notifying part 48 displays, as the error screen, for example, Error and instructs the operation display part 43 to display a password input screen 80 (see FIG. 8) asking for a password. A password legitimate to the password input screen 80 may be a use permission password set by the manager to permit to use the toner or a password in the identification information of the manager. Alternatively, the error notifying part 48 displays, as the error screen, for example, Error and instructs the operation display part 43 to display a printing continuation selecting screen 81 (see FIG. 9) asking for a selection whether or not to continue printing.

Next, the operation of forming an image by the multifunction peripheral having such a configuration, e.g. an image forming operation (a normal operation) in a case where the section management or the user management is enabled, will be described. When the power is supplied to the multifunction peripheral 1, various parameters are initialized and initial determination, such as temperature determination of the fixing part 24, is carried out. Subsequently, in the multifunction peripheral 1, when image data is inputted and a printing start is directed from the image reading device 5, the manager terminal 31, the terminal devices 33 and 34, or the terminal devices 36 and 37 arranged outside, or the like, image forming operation is carried out as follows.

Firstly, the surface of the photosensitive drum 13 is electrically charged by the charger 14. Then, an electrostatic latent image is formed on the surface of the photosensitive drum 13 by a laser light (refer to an arrow P) from the exposure device 11. The electrostatic latent image is developed to a toner image having a correspondent color in the development device 15 by the toner supplied from each toner container 20. The toner image is first-transferred onto the surface of the intermediate transferring belt 10 in the first transferring part 16. The above-mentioned operation is repeated in order by the respective image forming parts 12, thereby forming the toner image having full color onto the intermediate transferring belt 10. Incidentally, toner and electric charge remained on the photosensitive drum 13 are removed by the cleaning device 17 and the static eliminator 18.

On the other hand, the sheet fed from the sheet feeding cartridge 3 or a manual bypass tray (not shown) by the sheet feeding part 22 is conveyed to the second transferring part 23 in a suitable timing for the above-mentioned image forming operation. Then, in the second transferring part 23, the toner image having full color on the intermediate transferring belt 10 is second-transferred onto the sheet. The sheet with the second-transferred toner image is conveyed to a downstream side on the conveying path 21 to enter the fixing part 24, and then, the toner image is fixed on the sheet in the fixing part 24. The sheet with the fixed toner image is ejected from the sheet ejection port 24 onto the ejected sheet tray 4.

Figure 10:
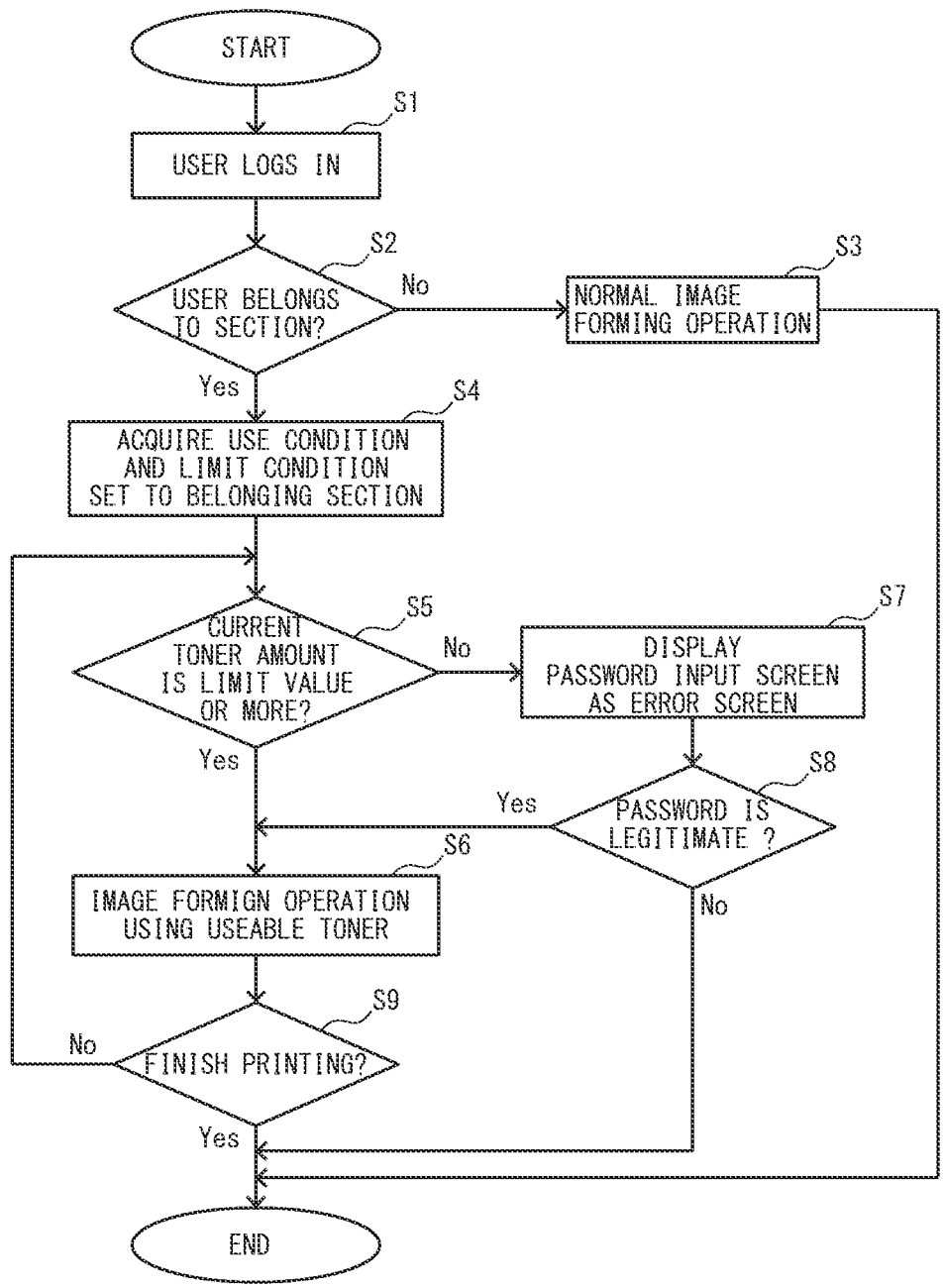
FIG. 10 is a flowchart showing an image forming operation according to use condition and limit condition of a toner of each color determined for each section in the multifunction peripheral according to the embodiment of the present disclosure.

Next, in cases in which one or more sections are registered and the section management is enabled and in which one or more users are registered and the user management is enabled in the multifunction peripheral 1 configured as described above, an image forming operation (first limiting operation) corresponding to the use conditions and the limit conditions of the toners of the respective colors set for each section will be explained with reference to FIG. 10. FIG. 10 is a flowchart illustrating an exemplary first limiting operation.

At first, when the user uses the multifunction peripheral 1, the user log-in screen (not shown) is displayed in the display part 51 of the operation display part 43 by the authentication part 45. The user logs in by inputting identification information to the user log-in screen (at step S1).

Here, the control part 40 judges whether or not a section code is included in the identification information of the logged-in user (at step S2). If the section code is not included in the identification information of the logged-in user (at step S2: No), the control part 40 executes a normal image forming operation as described above for a printing job, such as printing and copying inputted from the user (at step S3).

Meanwhile, in a case when the section code is included in the identification information of the logged-in user (at step S2: Yes), the control part 40 acquires the use conditions and the limit conditions of the toners of the respective colors set for the section to which the user belongs to execute the image forming operation corresponding to the toner use conditions and the limit conditions for the printing job inputted by the user (at step S4). For instance, as shown in FIG. 7, when the use conditions and the limit conditions are set in the toner use limiting screen 67, it is possible to acquire the use conditions that the black and magenta toners are usable and that the cyan and yellow toners are unusable and the limit conditions that the toner limit value of the black toner is 0% and that the toner limit value of the magenta toner is 50%.

Next, the control part 40 acquires a toner amount of each toner detected by the toner amount detecting part 44. Then, the control part 40 judges the limit condition whether or not the toner amount of the toner whose use condition is set to be usable is more than its toner limit value (at step S5). In the present embodiment, a case when the control part 40 judges whether or not the toner amount of magenta whose use condition is usable is more 50% of its toner limit value will be described.

Here, in response to the input of the printing job to the multifunction peripheral 1 made by the user, in a case when the toner amount of magenta is more than 50% of its toner limit value (at step S5: Yes), the control part 40 executes the image forming operation for the printing job corresponding to the use conditions acquired from the storage part 41 (at step S6). For instance, in a case when the use conditions are set such that the black and magenta toners are usable and the cyan and yellow toners are unusable, the control part 40 operates only the image forming parts 12 corresponding to black and magenta without operating the image forming parts 12 corresponding to cyan and yellow to form black and magenta toner images on the intermediate transfer belt 10. The other processes of this image forming operation are the same with those of the normal image forming operation described above, so that an explanation the other processes will be omitted here.

Meanwhile, in a case when the toner amount of magenta is lower than 50% of its toner limit value (at step S5: No), the error notifying part 48 indicates Error as the error screen and causes the operation display part to display the password input screen 80 asking for input of a password (at step S7).

When a legitimate password is inputted in the password input screen 80 here (at step S8: Yes), the control part 40 executes the image forming operation for the printing job by using the magenta toner regardless of the limit condition (at step S6). In a case when no legitimate password is inputted into the password input screen 80 (at step S8: No), the control part 40 finishes the image forming operation as a limiting process limiting the use of the magenta toner.

It is noted that in a case when the toner limit value of a predetermined toner (the black toner in this example) is zero %, a toner amount detected by the toner amount detecting part 44 will not be less than the toner limit value. When the toner amount detected by the toner amount detecting part 44 becomes almost zero %, the control part 40 interrupts the image forming operation and displays an error screen indicating that the predetermined toner is depleted and must be replenished on the operation display part 43. The control part 40 interrupts the image forming operation until when the predetermined toner is replenished. Then, when the predetermined toner is replenished, the toner amount detected by the toner amount detecting part 44 exceeds the toner limit value of zero %. Accordingly, in the case when the toner limit value of the predetermined toner is zero %, the control part 40 needs not to judge the abovementioned limit condition (step S5).

After executing the image forming operation for the printing job (step S6), the control part 40 judges whether or not there exists a succeeding printing job (at step S9). If there is a succeeding printing job (at step S9: Yes), the control part 40 repeats the abovementioned judgment of the limit conditions (step S5) and the image forming operation (step S6). If there is no succeeding printing job (at step S9), the control part 40 finishes the image forming operation.

Figure 11:
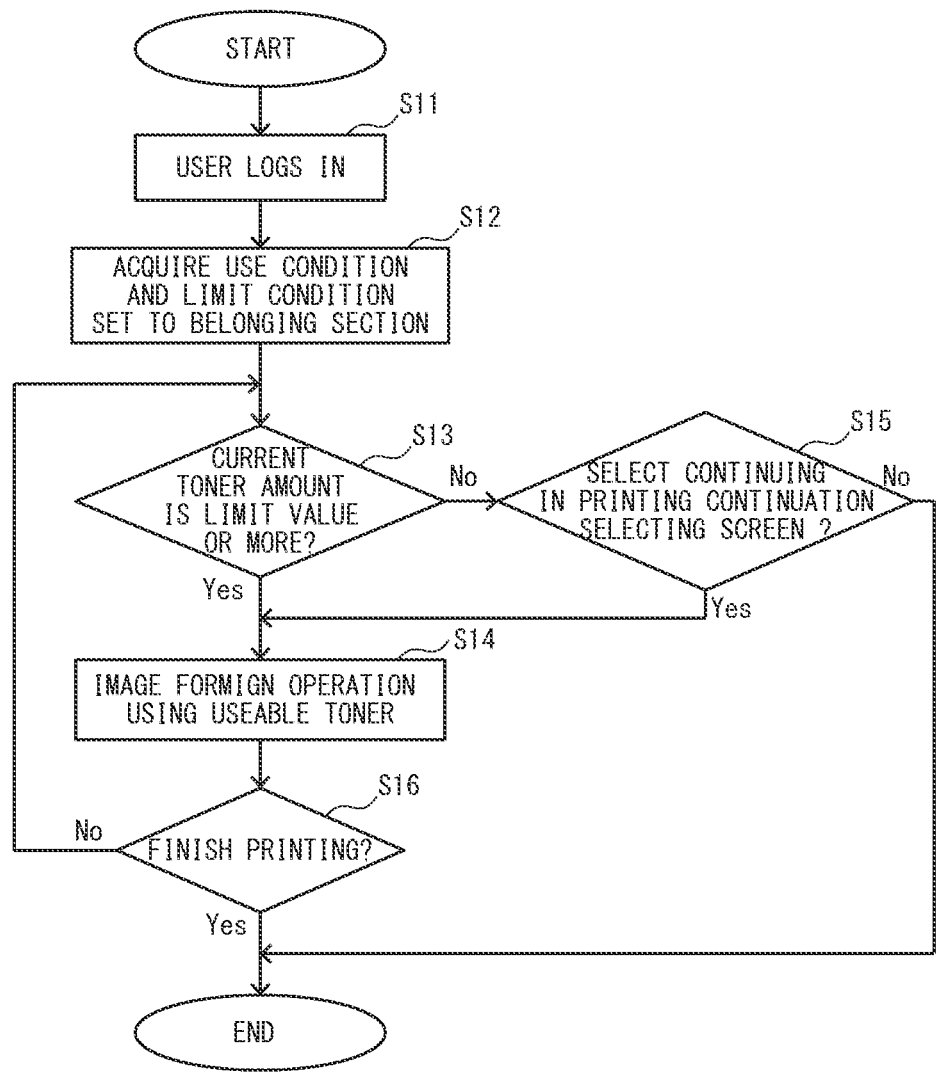
FIG. 11 is a flowchart showing an image forming operation according to use condition and limit condition of a toner of each color determined for each user in the multifunction peripheral according to the embodiment of the present disclosure.

Next, in cases in which the section management is disabled and in which one or more users are registered and the user management is enabled in the multifunction peripheral 1 configured as described above, an image forming operation (second limiting operation) corresponding to the use conditions and the limit conditions of the toners of the respective colors set for each user will be explained with reference to FIG. 11. FIG. 11 is a flowchart illustrating an exemplary second limiting operation.

At first, when the user uses the multifunction peripheral 1, the user log-in screen (not shown) is displayed on the operation display part 43 by the authentication part 45. The user logs in by inputting identification information to the user log-in screen (at step S11).

Here, the control part 40 acquires the use conditions and the limit conditions of the respective color toners set for the user from the storage part 41 in the same manner with the first limiting operation in order to execute the image forming operation corresponding to the use conditions and the limit conditions of toners for the printing job inputted from the logged-in user (at step S12).

Next, the control part 40 acquires a toner amount of each toner detected by the toner amount detecting part 44. Then, the control part 40 judges the limit condition whether or not the toner amount of the toner whose use condition is set to be usable is more than its toner limit value (at step S13). In the present embodiment, a case when the control part 40 judges whether or not the toner amount of magenta whose use condition is usable is more 50% of its toner limit value.

Here, in response to the input of the printing job to the multifunction peripheral 1 made by the user, in a case when the toner amount of magenta is more than 50% of its toner limit value (at step S13: Yes), the control part 40 executes the image forming operation for the printing job corresponding to the use conditions acquired from the storage part 41 (at step S14) in the same manner with the first limiting operation.

Meanwhile, in a case when the toner amount of magenta is less than 50% of its toner limit value (at step S13: No), the error notifying part 48 indicates Error as the error screen and causes the operation display part 43 to display the printing continuation selecting screen 81 asking for a selection whether or not continue to print (at step S15).

When the user selects to continue to print in the printing continuation selecting screen 81 (at step S15: Yes), the control part 40 executes the image forming operation for the printing job by using toners of colors other than magenta (at step S14). For instance, the control part 40 operates only the image forming part 12 corresponding to black without operating the image forming parts 12 corresponding to cyan and yellow whose use condition is unusable and the image forming part 12 corresponding to magenta whose use condition is usable and whose toner amount is less than the toner limit value to form black toner image on the intermediate transfer belt 10. The other processes of this image forming operation are the same with those of the normal image forming operation described above, so that an explanation the other processes will be omitted here.

Meanwhile, in a case when the user selects not to continue to print in the printing continuation selecting screen 81 (at step S15: No), the control part 40 finishes the image forming operation.

After executing the image forming operation to the printing job (at step S14), the control part 40 judges whether or not there exists a succeeding printing job (at step S16). If there is a succeeding printing job (at step S16: Yes), the control part 40 repeats the abovementioned judgment of the limit conditions (step S13) and the image forming operation (step S14). If there is no succeeding printing job (at step S16: No), the control part 40 finishes the image forming operation.

It is noted that in the present embodiment, while the case in which the error notifying part 48 displays the password input screen 80 as the error screen on the operation display part 43 when the toner amount of toner whose use condition is set to be usable is less than its toner limit value in the image forming operation (first limiting operation) corresponding to the use conditions and the limit conditions of the toners of the respective colors set for each section has been described, the present disclosure is not limited to this case. For instance, according to another embodiment, the error notifying part 48 may display the printing continuation selecting screen 81 on the operation display part 43 as an error screen when the toner amount is less than the toner limit value in the first limiting operation.

Still further, while the case in which the error notifying part 48 displays the printing continuation selecting screen 81 as the error screen on the operation display part 43 in the case when the toner amount of toner whose use condition is set to be usable is less than its toner limit value in the image forming operation (second limiting operation) corresponding to the use conditions and the limit conditions of the toners of the respective colors set for each user has been described, the present disclosure is not limited to such case. For instance, according to another embodiment, the error notifying part may display the password input screen 80 on the operation display part 43 as an error screen when the toner amount is less than the toner limit value in the second limiting operation.

Alternatively, according to a still other embodiment, in a case when the toner amount is less than the toner limit value in the first limiting operation or the second limiting operation, the control part 40 may execute the image forming operation for the printing job by using the toners of the colors other than the toner whose toner amount is less than the toner limit value or may finish the image forming operation, without displaying the error screen by the error notifying part 48 on the operation display part 43.

Still further, in the embodiments described above, while the case in which the control part 40 finishes the image forming operation as a limiting process limiting the use of the toner if a legitimate password is not inputted to the password input screen 80 when the error notifying part 48 displays the password input screen 80 on the operation display part 43 as the error screen in the first limiting operation or the second limiting operation has been described, the present disclosure is not limited to such case. For instance, according to another embodiment, the image forming operation for the printing job may be executed by using the toners of the colors other than the toner whose toner amount is less than the toner limit value as the limiting process limiting the use of the toner in this case.

In accordance with the present embodiment, as described above, the multifunction peripheral 1 includes the image forming parts 12 executing the image forming operation capable of forming the images for the respective colors of the toners (developers), the toner containers 20 (developer containers) containing the toners of the respective colors to be supplied to the image forming parts 12, the toner amount detecting parts 44 (developer amount detecting parts) detecting the toner amounts (developer amounts) of the respective colors contained in the toner containers 20, the use setting part 46 setting the use condition indicating whether the toner is usable or unusable each color, and the limit setting part 47 setting the limit condition indicating the toner remaining amount (toner limit value, limit value of developer) of each color to be maintained in each toner container 20. The image forming part 12 executes the image forming operation in accordance to the use condition set by the use setting part 46, the toner amount detected by the toner amount detecting part 44, and the limit condition set by the limit setting part 47.

According to this, it is possible to manage the use and consumption of the toner for each color corresponding to a request of the manager or the user. Then, if the toner of a predetermined color is unevenly used, it is possible to suppress the toner of the predetermined color from being consumed. Still further, because it is possible to keep toner limited by the toner limit value within the toner container 20, such kept toner can be used as necessary.

Still further, in accordance with the present embodiment, the image forming part 12 implements the limiting process limiting a use of the toner of a predetermined color in the case when the toner amount of the predetermined color detected by the toner amount detecting part 44 is less than the toner limit value set as the limit condition in the limit setting part 47. According to this, it is possible to suppress the toner of the predetermined color from being excessively used because the use of the toner of the predetermined color is always limited in the case when the toner amount of the predetermined color is less than its toner limit value.

Still further, in accordance with the present embodiment, the multifunction peripheral 1 further includes the error notifying part 48 instructing to display the password input screen 80 asking for an input of a password in a case when the toner amount of the predetermined color detected by the toner amount detecting part 44 is less than the toner limit value set as the limit condition in the limit setting part 47. In the case when the toner amount of the predetermined color detected by the toner amount detecting part 44 is less than the toner limit value set as the limit condition in the limit setting part 47, the image forming part 12 continues the image forming operation by using the toner of the predetermined color regardless of the limit condition when a legitimate password is inputted to the password input screen 80. However, if the legitimate password is not inputted to the password input screen 80, the image forming part 12 implements the limiting process of limiting the use of the toner of the predetermined color. According to this, it is possible for the user who does not have an access level of manager authority to use the toner of the predetermined color as long as the user knows the password when the toner amount of the predetermined color is less than the toner limit value. Accordingly, it becomes possible to stepwisely divide the toner use limit without endowing the manager authority to the user.

Still further, in accordance with the present embodiment, the image forming part 12 continues the image forming operation by using the toner of the color, whose use condition is set to be usable, other than the predetermined color, as the limiting process. According to this, it is possible to respond to a request of the user who wishes to execute the image forming operation regardless of the color.

Still further, in accordance with the present embodiment, the image forming part 12 finishes the image forming operation as the limiting process. According to this, it is more possible to suppress the toner of the predetermined color from being excessively used and to cut the wasteful image forming operation.

Still further, in accordance with the present embodiment, the multifunction peripheral 1 further includes the authentication part 45 authenticating the user or the section based on identification information peculiar to the user or to the section to which one or more users belong. The use setting part 46 sets the use condition for each user or each section. The limit setting part 47 sets the limit condition each user or each section. In the case when the predetermined user or the predetermined section is authenticated by the authentication part 45, the image forming part 12 executes the image forming operation in accordance to the use condition set by the use setting part 46 for the predetermined user or the predetermined section and to the limit condition set by the limit setting part 47 for the predetermined user or the predetermined section. According to this, it is possible to set the use conditions and the limit conditions of the toner for each section or each user, so that it becomes possible to stepwisely divide the toner use limit corresponding to the section and the user.

Still further, in accordance with the present embodiment, in the case when the user authenticated by the authentication part 45 belongs to a predetermined section, the image forming part 12 executes the image forming operation in accordance to the use condition set by the use setting part 46 for the predetermined section and to the limit conditions set by the limit setting part 47 for the predetermined section. According to this, it is possible to cut log-in of the section as long as the user belonging to the section logs-in in executing the image forming operation in accordance to the use conditions and the limit conditions set for each section.

Still further, in accordance with the present embodiment, the use setting part 46 enables to set the use condition for each section only when the manager is authenticated as the user by the authentication part 45, and the limit setting part 47 enables to set the limit condition for each section only when the manager is authenticated as the user by the authentication part 45. According to this, it is possible for the manager to manage the toner use limit for each section or each user. As a result, it is possible to manage a toner use amount of each user and each section and to make developer consumption costs even among the users and the sections.

Although, in the present embodiment, as the limiting process of the toner (concerned toner) whose toner amount is less than its limit value, the case of not operating the image forming part 12 corresponding to the concerned toner in order to execute the image forming operation by using toners of colors other than the concerned toner has been described, the present disclosure is not limited to such case. For instance, according to another embodiment, the multifunction peripheral 1 may be configured such that the supply of toner from the toner container 20 corresponding to the concerned toner to the image forming part 12 is stopped.

Still further, according to a still other embodiment, the authentication part 45 may display the section log-in screen and the user log-in screen on the manager terminal 31, the user terminal units 33 and 34, the terminal units 36 and 37, and others through a network instead of the operation display part 43 of the multifunction peripheral 1.

Still further, according to a still other embodiment, the use setting part 46 and the limit setting part 47 may accept the use conditions and the limit conditions from the manager terminal 31 of the logged-in manager and others through the network 38, instead of the operation through the operation display part 43 of the multifunction peripheral 1.

Still further, according to a different embodiment, the control part 40 may transmit and display the toner use limit confirmation screen 82 (see FIG. 12) for confirming the use conditions and the limit conditions of the user on the terminal devices 33 and 34 or the terminal devices 36 and 37 of the user through the network 38. It is noted that in the toner use limit confirmation screen 82, it is not necessary to display the toner limit value of toner, e.g., yellow toner in FIG. 12, for which the toner limit value is not set. Still further, in the toner use limit confirmation screen 82, with respect to the toner, e.g., the cyan toner in FIG. 12, which is set to be unusable even though its toner limit value is set, the toner limit value may be grayed out and displayed and the gray-out may be released or the toner limit value may not be indicated when it becomes usable.

Still further, according to a still other embodiment, the error notifying part 48 may display the error screen on the terminal devices 33 and 34, the terminal devices 36 and 37 or the like of the logged-in user through the network 38, instead of the operation display part 43 of the multifunction peripheral 1 or together with the operation display part 43.

The present embodiment was described in a case of applying the configuration of the present disclosure to the multifunction peripheral 1. On the other hand, in another embodiment, the configuration of the disclosure may be applied to another image forming apparatus, such as a printer, a copying machine, a facsimile or the like. Moreover, the present embodiment was described in a case of applying the configuration of the present disclosure to the image forming apparatus using the toner as the developer. On the other hand, in another embodiment, the configuration of the disclosure may be applied to another image forming apparatus using an ink or another developer.

While the present disclosure has been described with reference to the particular illustrative embodiments, it is not to be restricted by the embodiments. It is to be appreciated that those skilled in the art can change or modify the embodiments without departing from the scope and spirit of the present disclosure.

What is claimed is:

1. An image forming apparatus, comprising:
   image forming parts executing an image forming operation capable of forming images for respective colors of developers;
   developer containers containing the developers of the respective colors to be supplied to the image forming parts;
   developer amount detecting parts detecting developer amounts of the respective colors contained in the developer containers;
   a use setting part setting a use condition indicating whether the developer is usable or unusable for each color; and
   a limit setting part setting a limit condition indicating a limit value of the developer amount of each color to be maintained in each developer container,
   wherein each of the image forming parts executes the image forming operation in accordance to the use condition set by the use setting part, to the developer amount detected by each of the developer amount detecting parts, and to the limit condition set by the limit setting part.

2. The image forming apparatus according to claim 1, wherein
   each of the image forming parts implements a limiting process limiting a use of the developer of the predetermined color in a case when the developer amount of the predetermined color detected by each of the developer amount detecting parts is less than the limit value set as the limit condition in the limit setting part.

3. The image forming apparatus according to claim 2, wherein
   each of the image forming parts continues the image forming operation by using the developer of the color, whose the use condition is usable, other than the predetermined color, as the limiting process.

4. The image forming apparatus according to claim 2, wherein
   each of the image forming parts finishes the image forming operation as the limiting process.

5. The image forming apparatus according to claim 1 further comprising:

an error notifying part instructing to display a password input screen asking for an input of a password in a case when the developer amount of the predetermined color detected by each of the developer amount detecting parts is less than the limit value set as the limit condition in the limit setting part, wherein, in the case when the developer amount of the predetermined color detected by each of the developer amount detecting parts is less than the limit value set as the limit condition by the limit setting part, each of the image forming parts continues the image forming operation by using the developer of the predetermined color regardless of the limit condition when a legitimate password is inputted to the password input screen, or implements a limiting process limiting a use of the developer of the predetermined color when the legitimate password is not inputted to the password input screen.

6. The image forming apparatus according to claim 5, wherein each of the image forming parts continues the image forming operation by using the developer of the color, whose the use condition is usable, other than the predetermined color, as the limiting process.

7. The image forming apparatus according to claim 5, wherein each of the image forming parts finishes the image forming operation as the limiting process.

8. The image forming apparatus according to claim 1 further comprising:

an authentication part authenticating a user or a section based on identification information peculiar to the user or to the section to which one or more users belong, wherein the use setting part sets the use condition for each user or each section, the limit setting part sets the limit condition for each user or each section, and each of the image forming parts executes the image forming operation in accordance to the use condition set for a predetermined user or a predetermined section by the use setting part and to the limit condition set for the predetermined user or the predetermined section by the limit setting part in a case when the predetermined user or the predetermined section is authenticated by the authentication part.

9. The image forming apparatus according to claim 8, wherein each of the image forming parts executes the image forming operation in accordance to the use condition set for the predetermined section by the use setting part and to the limit condition set for the predetermined section by the limit setting part in a case when the user authenticated by the authentication part belongs to the predetermined section.

10. The image forming apparatus according to claim 8, wherein the use setting part enables to set the use condition for each section only when a manager is authenticated as the user by the authentication part, and the limit setting part enables to set the limit condition for each section only when a manager is authenticated as the user by the authentication part.

\* \* \* \* \*